(12) United States Patent
Channon (10) Patent No.: US 11,480,292 B2
(45) Date of Patent: Oct. 25, 2022

(54) TABLET PC AND SMARTPHONE MOUNT

(71) Applicant: Michael Ralph Channon, Derbyshire (GB)

(72) Inventor: Michael Ralph Channon, Derbyshire (GB)

(73) Assignee: Michael Ralph Channon, Derbyshire (GB)

( * ) Notice: Subject to any disclaimer, the term of this patent is extended or adjusted under 35 U.S.C. 154(b) by 211 days.

(21) Appl. No.: 15/579,814

(22) PCT Filed: May 4, 2016

(86) PCT No.: PCT/GB2016/051271
§ 371 (c)(1),
(2) Date: Dec. 5, 2017

(87) PCT Pub. No.: WO2016/198828
PCT Pub. Date: Dec. 15, 2016

(65) Prior Publication Data
US 2018/0356030 A1   Dec. 13, 2018

(30) Foreign Application Priority Data
Jun. 6, 2015 (GB) .................................. 1509836

(51) Int. Cl.
*F16M 13/02* (2006.01)
*F16M 11/10* (2006.01)
(Continued)

(52) U.S. Cl.
CPC .......... *F16M 13/022* (2013.01); *B60R 11/00* (2013.01); *B60R 11/02* (2013.01);
(Continued)

(58) Field of Classification Search
CPC .... F16M 13/022; F16M 11/041; F16M 11/10; F16M 13/00; F16M 13/02; B60R 11/00;
(Continued)

(56) References Cited

U.S. PATENT DOCUMENTS

| 164,325 | A | * | 6/1875 | Phelan | ................ | A47B 23/042 |
| | | | | | | 248/451 |
| 524,451 | A | * | 8/1894 | Ward | ................... | A47B 23/042 |
| | | | | | | 248/451 |

(Continued)

FOREIGN PATENT DOCUMENTS

GB       2100459 A  * 12/1982  ............. F16M 11/10

OTHER PUBLICATIONS

Amazon.com IPad & Digital Tablet https://www.amazon.com/AirClipZ-Airplane-Compatible-Digital-Tablets/dp/B00K7ZYQC6/ref=sr_1_3?crid=2OVPHRVJRLN6O&keywords=digital+tablet+travel+holder+for+airplane+tray+table&qid=1656792842&sprefix=digital+tablet+travel+holder+for+ariplane+tray+table%2Caps%2C56&sr=8-3 (Year: 2013).*

(Continued)

*Primary Examiner* — Kimberly T Wood
(74) *Attorney, Agent, or Firm* — Taylor Russell & Russell, P.C.

(57) ABSTRACT

Various mountings are disclosed for holding a portable screen device in an attitude for hands-free viewing. The mountings are particularly, but not exclusively, useful for supporting portable screen devices (522, FIG. 5A) from the seat-back trays (528) found in passenger vehicles, when the trays are in the "up" position. Each mounting comprises a pair of hooked members (510), each hooked member having a spine (515) provided with first and second hook portions (512, 514) arranged on opposite sides of the spine to face in mutually opposed directions. Each hook portion (512, 514)

(Continued)

comprises an open end and a closed end bounded by outer and inner, mutually opposed sides of the hook portion. Various embodiments are disclosed that are also capable of supporting portable screen devices when seat-back trays are in the "down" position, see e.g., FIG. 5B. In most embodiments, both hook portions (512, 514) are unitary with the spine (515), which comprises the inner side of both hook portions, but embodiments are also proposed in which the first hook portion (612, FIG. 6) is formed separately from the spine (615) and is selectively positionable thereon. When in use as a mounting, the hooked members 510, FIG. 5 A) are spaced apart from each other and the second hook portions (514) receive the screen device (522), which spans the distance between the hooked members.

13 Claims, 5 Drawing Sheets (51) Int. Cl.
  *F16M 11/04* (2006.01)
  *B60R 11/02* (2006.01)
  *B60R 11/00* (2006.01)
  *F16M 13/00* (2006.01)
(52) U.S. Cl.
  CPC ...... *B60R 11/0241* (2013.01); *B60R 11/0252* (2013.01); *F16M 11/041* (2013.01); *F16M 11/10* (2013.01); *F16M 13/00* (2013.01); *B60R 2011/0012* (2013.01)
(58) Field of Classification Search
  CPC . B60R 11/02; B60R 11/0241; B60R 11/0252; B60R 2011/0012; G06F 1/16
  USPC .... 248/231.81, 215, 441.1, 442.2, 444, 445, 248/447.1, 447.2, 451, 452, 453, 322, 248/320, 323, 328, 339
  See application file for complete search history.

(56) References Cited

U.S. PATENT DOCUMENTS

| | | | | |
|---|---|---|---|---|
| 557,773 | A * | 4/1896 | Deplanty et al. | F16M 13/02 248/231.31 |
| 743,678 | A * | 11/1903 | Bear | A47B 23/042 248/452 |
| 751,408 | A * | 2/1904 | Pettit | A47B 23/042 248/452 |
| 884,722 | A * | 4/1908 | Davis | A47B 23/042 248/452 |
| 916,901 | A * | 3/1909 | Trimble | A47B 23/042 248/452 |
| 939,942 | A * | 11/1909 | Brauchli | A47B 23/042 248/452 |
| 1,269,925 | A * | 6/1918 | Gauntt | A47B 23/042 248/452 |
| 1,938,528 | A * | 12/1933 | Marseglia | A47B 23/043 248/444 |
| 2,235,649 | A * | 3/1941 | Shaw | A47F 7/02 248/452 |
| 2,402,930 | A * | 6/1946 | Swearngin | A47B 23/04 248/453 |
| 2,441,932 | A * | 5/1948 | Curry | A47B 23/044 248/451 |
| 3,089,597 | A | 7/1960 | Kaplan | |
| 3,076,285 | A * | 2/1963 | Sparkman | A47B 23/043 248/448 |
| 3,330,524 | A * | 7/1967 | Foley | B42D 3/126 248/444.1 |
| 4,448,384 | A * | 5/1984 | Jones, Jr. | A47B 23/004 248/443 |
| 5,316,256 | A * | 5/1994 | Siebenaler | A47B 23/042 248/453 |
| 5,542,314 | A * | 8/1996 | Sullivan | B60R 11/0252 211/119 |
| 6,032,842 | A * | 3/2000 | Brickner | B60R 9/02 224/546 |
| 6,412,675 | B1 * | 7/2002 | Pope | B60R 9/02 224/325 |
| 6,590,767 | B2 * | 7/2003 | Liao | G06F 1/1632 248/917 |
| 7,699,273 | B2 * | 4/2010 | Wobben | B60R 11/02 248/27.1 |
| 7,887,017 | B2 * | 2/2011 | Moran | B44C 5/00 248/215 |
| 8,262,040 | B1 * | 9/2012 | Haucke | B60D 1/66 248/215 |
| 9,888,780 | B2 * | 2/2018 | Rabin | B60N 3/002 |
| 2006/0284045 | A1 * | 12/2006 | Conibear | A47B 23/02 248/441.1 |
| 2007/0075204 | A1 | 4/2007 | Fertil | |
| 2007/0075210 | A1 * | 4/2007 | Yang | A47G 1/142 248/465.1 |
| 2012/0235001 | A1 * | 9/2012 | Somuah | B60R 11/0235 248/287.1 |
| 2016/0257404 | A1 * | 9/2016 | Ferris | B64D 11/00152 |
| 2017/0049239 | A1 * | 2/2017 | Rabin | B60N 3/002 |

OTHER PUBLICATIONS

"Amazon.com iPad and Digital Tablet Travel Holder for Airplane Tray Table in Black: Cell Phones & Accessories", Jul. 10, 2014 (Jul. 10, 2014), XP055400041.—Retrieved from the Internet.

* cited by examiner

FIG. 6C

TABLET PC AND SMARTPHONE MOUNT

TECHNICAL FIELD

The present disclosure relates to mountings for tablet computers, smartphones and the like portable screen devices, and in particular, but not exclusively, to mountings that conveniently enable them to be supported, for example, on the trays found hinged to the back of airline, train, coach and car seats.

BACKGROUND

Mountings are already known which permit tablet computers, smartphones and other portable screen devices to be mounted for hands-free viewing, e.g., on the back of airline, train and bus seats, and on the drop-down trays often found on such seat backs. Usually, such mountings are configured to support the screen device in an attitude for viewing when a drop-down tray is in the down position.

Unfortunately, when such a tray is in the down position, it restricts the space available to the person for whom it is provided. It would therefore be desirable to provide mountings for portable screen devices, which mountings take up the minimum amount of space and which are readily mountable and demountable upon the tray when it is in the "up" position. It would be desirable for such mountings to be cheap to produce for sale as minor purchases, or even for giving away by a transport service provider, before or during journeys. It would additionally be desirable if such mountings were also able to support portable screen devices for viewing on such trays when the latter are in the "down" or in-use position. It would further be desirable if such mountings were simple to set up and use.

SUMMARY

In the present disclosure, "laterally", "upwardly", "downwardly", "rearwardly", "forwardly", "front", "rear", etc., should be understood to be approximate terms, relative to an observer's upright orientation with respect to gravity.

In general, the present disclosure relates to a mounting configured such that the mounting can hang from a laterally extending edge of an object with an upwardly extending surface and can support a tablet computer, smartphone or other portable screen device in an attitude for hands-free viewing; the mounting comprising a pair of hooked members, preferably formed from a rigid plastic material, each hooked member having a spine provided with first and second hook portions, each hook portion comprising an open end and a closed end bounded by inner and outer, mutually opposed side members of the hook portion, and the first and second hook portions being arranged on opposite sides of the spine to face in mutually opposed directions, such that in use the second hook portions engage the screen device.

The above-mentioned laterally extending edge of an object with an upwardly extending surface may be, e.g., an upper edge of a seat-back tray in the "up" position in a passenger vehicle. When used thus, the first hook portions are open in the downward direction and extend rearwardly to engage with said laterally extending edge and the second hook portions are open in the upward direction and extend forwardly from said upwardly extending surface to engage a lower edge of the screen device.

Preferably the mounting is further provided with means for additionally engaging the screen device during use to restrain or hold the screen device against relative movement between the screen device and the mounting.

For example, a means for additionally engaging the screen device may comprise at least one clip member configured to embrace an upper edge of a screen device and resilient coupling means for coupling the or each clip member to a hooked member. Furthermore, the at least one clip member, and a corresponding hooked member to which the or each clip member is to be coupled, may advantageously be provided with respective attachment points for the resilient coupling means.

In some embodiments as at present envisaged, and as seen in side elevation, the hook portions are rectilinear in configuration, the closed ends of the hook portions being straight between opposed side members of the hook portions. The spine of each hooked member may also be straight. These characteristics provide flat surfaces for contacting said upwardly extending surface, said laterally extending edge, and said screen device. In other embodiments, at least part of at least one of the hook portions of each hooked member, and/or at least part of the spine of each hooked member, may be curved or otherwise deviate from a straight line. This may be desirable to conform to, or avoid, surfaces that contact or confront the spine and hook portions.

With respect to the first hook portions and/or the second hook portions, and as seen in side elevation, the outer side members of the hook portions may be angled towards the spine, or opposed side members of the hook portions may extend parallel to each other, or the outer side members of the hook portions may be angled away from the spine.

In its simplest embodiments, each hooked member has a spine formed by a length of said rigid material, both ends of the spine being formed into a hook portion and the hook portions facing in mutually opposed directions. For convenience, the hook portions may be shaped identically, except for their directional orientation on the spine, thus rendering the hook portions functionally interchangeable.

It is preferred that at least the second hook portion on each hooked member is provided with a means for additionally engaging the screen device during use. In some embodiments, said means comprises a bias member, such as a spring device, arranged to urge the screen device into contact with an outer side member of the hook portion (the outer side member of a hook portion being the part that is spaced away from the spine). For example, the bias members may each comprise a cantilevered leaf spring attached at one end thereof to the spine and having its free end adjacent the closed end of the hook portion. Conveniently, such a leaf spring may comprise the same material as the spine and may be formed integrally therewith during a moulding operation or other forming operation used to produce the hooked members.

In preferred embodiments, the mountings are configured to be useable in first and second modes of use, the first mode of use being when hanging from the above-mentioned laterally extending edge of an object with an upwardly extending surface, e.g., an upper edge of a seat-back tray in the "up" position, and the second mode of use being when sitting on a substantially horizontal surface, e.g., the surface of a seat-back tray in the "down" position. In these preferred embodiments, the first and second hook portions respectively comprise:

a relatively narrow span hook portion that in the first mode of use embraces a laterally extending edge of an upwardly extending object; and a relatively broad span hook portion that supports a lower edge of said screen device in both the first and second modes of use, the broad span hook portion having an underside configured to sit on a substantially horizontal surface in the second mode of use.

Advantageously, a means for additionally engaging the screen device may comprise a plurality of detents that are spaced apart along the closed ends of the above-mentioned broad span hook portions between opposed side members thereof, the detents being arranged to engage an edge of the screen device during use, thereby to hold the screen device at a corresponding plurality of different angles for viewing.

To enhance rigidity of the mounting, and to provide a base to enhance the suitability of the mounting to sit on a substantially horizontally extending surface, such as a seat-back tray in the down position, the broad-span hook portion of each hooked member may be part of an essentially triangular or quadrilateral body as seen in side elevation, an underside of said body forming an underside of the hooked member, the underside making a first acute included angle with a straight line produced as a continuation of the spine and a second acute included angle between a straight line produced as an extension of said underside and a straight line produced as an extension of the closed end of the broad-span hook portion, whereby in the second mode of use the mounting holds the screen device at a convenient angle for viewing.

A functionally equivalent arrangement may be achieved by providing each hooked member with a support strut that extends underneath the broad-span hook portion and connects the spine to the underside of the broad-span hook portion, an underside of the strut forming an underside of the hooked member, the strut making a first acute included angle with the spine and a second acute included angle with the underside of the broad-span hook portion, such that in use the mounting holds the screen device at a convenient angle for viewing when the mounting is placed on a substantially horizontal surface.

In some embodiments, the hook portions of each hooked member are arranged on the spine in a directly back-to-back configuration with respect to each other, i.e., the hook portions are at least partly coextensive with each other on opposite sides of the spine. However, it is evident that, at the discretion of the designer, the hooked members can be produced with their first and second hook portions at any predetermined locations on the spines. For example, in the first mode of use, if the first hook portion is located below the upper end of the spine, instead of at the upper end, the mounting can hold the screen device at a higher viewing position relative to said laterally extending edge. This advantage is realised in favoured embodiments, in which in the first mode of use, the open end of the first hook portion is located adjacent the lower end of the spine, below the closed end of the second hook portion.

If required, stability of the mountings in the above-mentioned second mode of use may be enhanced by providing the underside of each hooked member with at least one feature, such as a foot or the like, effective to broaden said underside where it contacts said substantially horizontal surface.

Embodiments may also be envisaged in which said underside of each hooked member has a limited degree of concavity, whereby in the second mode of use, front and rear parts of said underside contact said horizontal surface, but a middle portion of said underside does not contact said horizontal surface; this may aid stability of the mounting in situations where the substantially horizontal surface is not completely flat.

Although at present it is thought preferable that both hook portions of each hooked member are unitary with the spine, so that the spine comprises the inner side member of both hook portions, alternative embodiments are also contemplated, in which the first hook portions are attachable to and detachable from the spines of their hooked members. In this way, the position of the first hook portion on the spine of each hooked member may be adjusted. In particular, the first hook portions may be slideable on their spines and lockable in selected positions thereon. In one mechanism for achieving this, each spine is provided with a slot extending longitudinally of the spine, the slot communicating with a channel formed internally of the spine and extending longitudinally thereof, the inner side member of each first hook portion having (a) a flange shaped to be complimentary to the shape of the channel and (b) a stem portion arranged to extend through the slot to join the flange portion to the inner side member of the first hook portion.

Opposed side walls of each channel may have a plurality of longitudinally spaced apart indentations, the flange portion having protrusions complimentary to the indentations, whereby when the flange portion is correctly aligned relative to the channel, the protrusions engage with the indentations and lock the first hook portion into position at a selected position on the spine.

To facilitate attachment of the first hook portion to the spine, the channel and the slot are open-ended at one or both ends of each spine and a side of the channel has a re-entrant profile adapted to allow insertion of the flange and stem into the channel and slot at a skew angle, and sliding of the first hook portion to a selected position on the spine, before twisting the first hook portion into a locked position on the spine.

The above-mentioned components of the mountings may be produced and sold separately, but preferably, each mounting is provided as a kit of parts including a pair of substantially identically configured hooked members that in use are laterally spaced apart from each other to support the screen device in a stable position. In the case where the first hook portions are attachable to the spines, the kit of parts preferably also includes the first hook portions.

Preferably, the kit of parts further includes at least one clip member configured to embrace an upper edge of the screen device and enable resilient coupling of the clip member to a hooked member, thereby in use to restrain the screen device against movement relative to the mounting.

The kit of parts preferably further includes at least one resilient coupling, such as at least one elasticated cord or the like, for coupling the clip member to a hooked member. Both the clip member, and a hooked member to which the clip is to be coupled, are preferably provided with respective attachment points for the resilient coupling.

The mountings of the present disclosure can be easily and cheaply mass-produced, for example as metal stampings or as plastic mouldings. Alternatively, they can also be produced by 3-D printing techniques.

BRIEF DESCRIPTION OF THE DRAWINGS

Some exemplary embodiments of mountings as summarised above will now be described with reference to the accompanying sketch drawings, in which.

The drawings are not to scale.

DETAILED DESCRIPTION OF ILLUSTRATIVE EMBODIMENTS

Figures 1A, 1B, 1C:
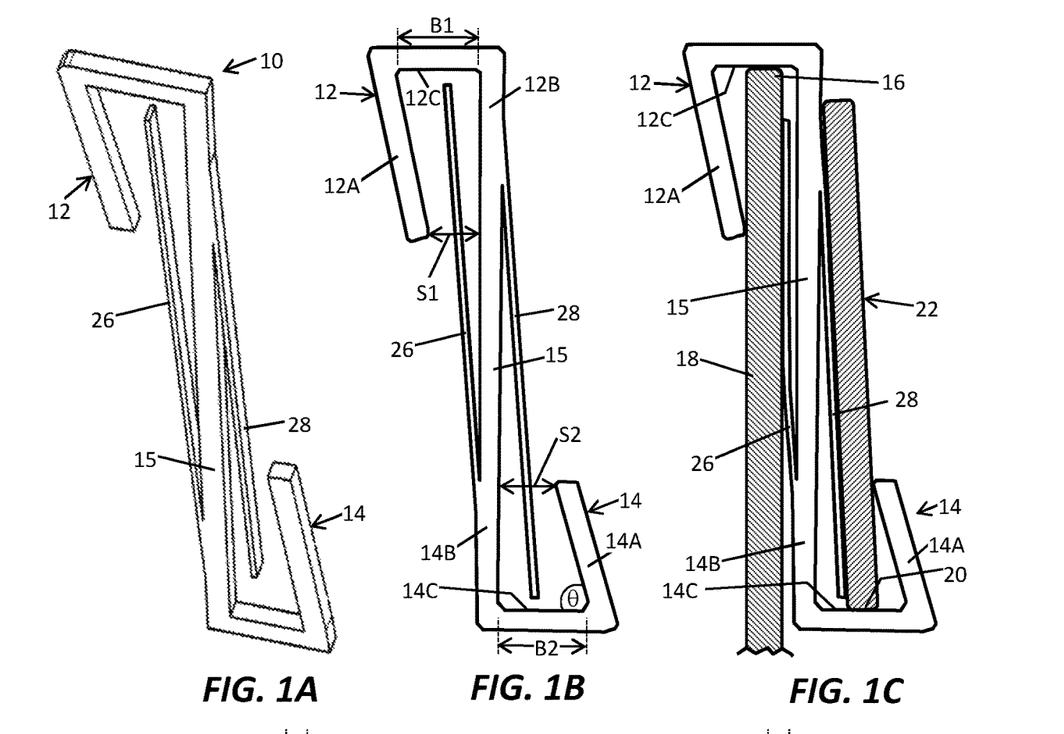
FIG. 1A is a perspective view of a hooked member comprising part of a mounting according to a first embodiment.
FIG. 1B is a side elevation of the hooked member of FIG. 1A.
FIGS. 1C and 1D are respectively side and front elevations of a mounting holding a screen device, the mounting comprising two laterally spaced apart hooked members like the one illustrated in FIG. 1A.

FIGS. 1A and 1B show a perspective view and a side elevation respectively of a hooked member 10 intended for use as part of a mounting comprising two identical hooked members 10.

The mounting can hold a tablet computer, smartphone or other portable screen device in an attitude for hands-free viewing, by hanging it from a laterally extending edge of an upwardly extending object, e.g., the upper edge of a seat-back tray in a passenger vehicle, such as an airliner, train carriage, motor coach or automobile. To enable this function, the hooked member 10 is configured such that first and second, upper and lower, hook portions 12, 14, are arranged on opposite sides of a common spine 15. Each hook portion 12, 14, comprises an open end of internal span S1, S2 and a closed end 12C, 14C of breadths B1, B2, the closed ends being bounded by mutually opposed side members 12A/12B and 14A/14B of the hook portions. In the illustrated embodiment, S1=S2 and B1=B2, though these dimensions are at the discretion of the designer. The hook portions are joined to each other by the spine, whereby one side member 12B, 14B of each hook portion is formed by the spine 15. Furthermore, as seen in FIGS. 1A and 1B, since the hook portions 12, 14, are arranged on the spine 15 to face in mutually opposed directions, upper hook portion 12 extends out from the spine in a first (leftward and rearward) direction and is open in the downward direction, whereas lower hook portion 14 extends out from spine 15 in a second (rightward and forward) direction opposed to the first direction and is open in the upward direction.

Hence, in FIG. 1C, the first hook portion 12 can be positioned to engage with the laterally extending upper edge 16 of an upwardly extending seat-back tray 18, indicated as a cross-section, thereby allowing the second hook portion 14 to extend outwardly from the upwardly extending surface of the tray 18 to engage a lower edge 20 of a screen device 22, also indicated as a cross section. Moreover, in the illustrated embodiment the hook portions 12 and 14 are identically shaped, except for their orientation with respect to the spine 15, thus rendering them functionally interchangeable. Therefore, simply by rotating the hooked member through 180 degrees, hook portion 14 can be used to engage the edge of the tray and hook portion 12 can be used to engage the edge of the screen device.

It will be noted from FIGS. 1A to 1C, that the hook portions 12, 14, are rectilinear in configuration, such that the closed ends 12C, 14C, of the hook portions are not curved or bent between opposed straight side members 12A, 12B and 14A, 14B, of the hook portions. This provides flat surfaces for contacting the upper edge 16 of the seat-back tray 18 and the lower edge 20 of the screen device 22. Furthermore, the spine 15 of the hooked member 10 is also straight, rather than curved, to provide flat surfaces for contacting the passenger-facing surface of the seat-back tray when the latter is in the "up" position. These characteristics are also present in the illustrated embodiments of FIGS. 2 to 6, to be described below. However, under some circumstances, special shaping of the spine and hook portions may be desirable to conform them more nearly to any curved or angled surfaces of the trays with which the spine and hook portions come into contact. For example, if a curved seat-back is recessed to receive a tray in the "up" position, the tray's surface profile facing a passenger may be matched to the surrounding seat-back profile. In that case, it could be desirable for the spine to be curved to at least approximate the curve of the surface profile of the tray. As a further example, the closed ends of the hook portions could be curved to conform to curved edges of the screen device or the upper edge of the tray.

Figure 1D:
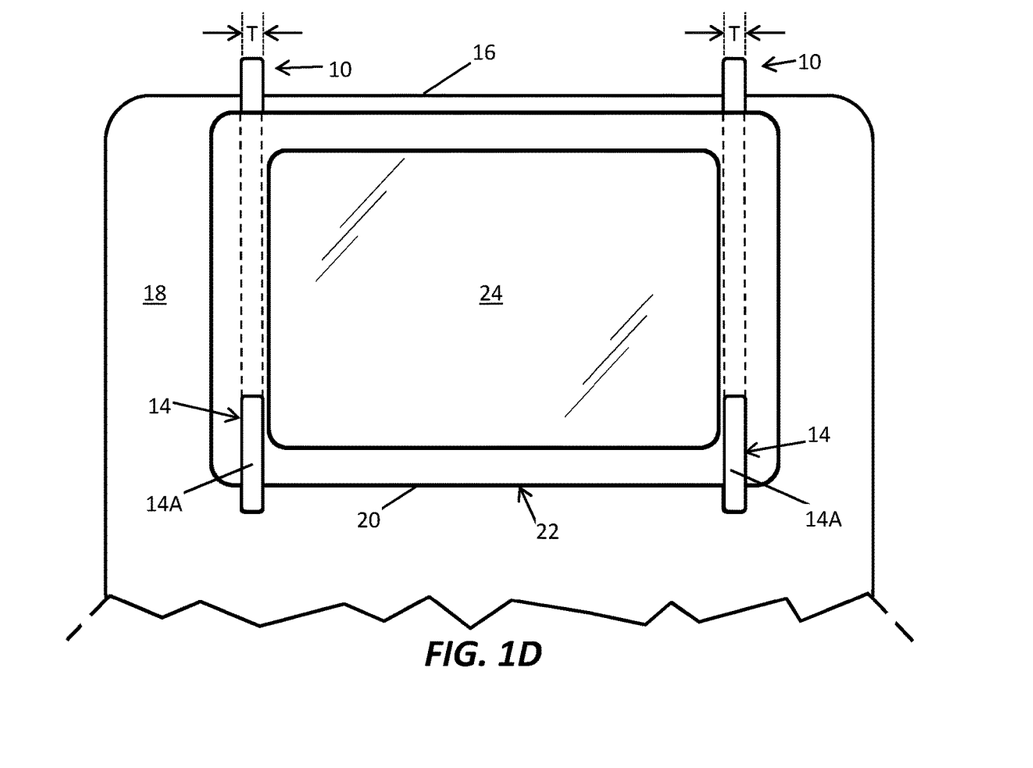

The front elevation of the complete mounting is shown in FIG. 1D, where the mounting comprises two of the hooked members 10, laterally spaced apart from each other and both hanging from the upper edge 16 of the seat-back tray 18 to support the screen device 22 in a stable position and at an attitude for viewing. It will be noticed that the hooked members 10 (in common with the other embodiments illustrated in the later drawing Figures) have a relatively small thickness T, so that the outer side members 14A of the second hook portions 14 do not significantly obscure the screen 24 of the screen device 22. If desired, to further reduce obscuration of the screen, the outer side members 14A of the hook portions 14 supporting the screen device 22 may be reduced in height, consistent with safely retaining the screen device in the mounting.

Whereas the second hook portions 14 engage the lower edge of the screen device during use, such engagement alone may not always be effective to restrain the lower edge 20 of the screen device 22 from sliding on the closed ends 14C of the hook portions. Hence, it may be desirable to provide the mounting with additional means for engaging the screen device, in order to restrain or hold it against movement relative to the mounting.

Such additional means for engaging the screen device may, for example, comprise resilient members that bear against the screen device to help hold it in place, and in the embodiment of FIGS. 1A to 1D, the first and second hook portions 12, 14, are each provided with a spring member in the form of a leaf spring 26, 28. In use as shown, the leaf springs 28 act to help restrain the screen device 22 against unwanted movement relative to the hook portions 14 by bearing against the rear of the screen device to gently urge the front of the screen device 22 into contact with the outer side members 14A of the hook portions 14. The outer side member of a hook portion is here defined as the part that is spaced away from the spine 15. Leaf spring 26 is on the opposite side of the spine 15 and therefore acts in opposition to leaf spring 28 by gently pushing the spine 15 away from the upright tray 18, so helping to bring the outer side member 12A of hook portion 12 into contact with the rear surface of the tray. The leaf springs are cantilevered and extend away from their respective attachments to the spine 15 at a shallow acute angle of, e.g., 5 degrees. The free ends of the leaf springs 26, 28, extend to points close to, but not in contact with, respective closed ends 12C, 14C of the hook portions. It is convenient and minimises production costs if the leaf springs comprise the same material as the spine and are formed integrally therewith. In FIGS. 1A to 1D, both first and second hook portions 12, 14, are provided with a leaf spring 26, 28, for functional interchangeability as mentioned above. However, variants are envisaged in which neither, or only one, of the hook portions on hooked member 10 are provided with a leaf spring.

It should be understood that although FIG. 1C shows a tray 18 in a completely vertical position for convenience of illustration, this will not usually be the case in practice, because when the tray rests in the stowed position against the seat-back, it will share the attitude of the seat back, and its upper edge is thus likely to be inclined somewhat towards the viewer of the screen device. Unless allowed for in the design of the hooked members 10, this may cause the screen to be held at a less than optimum viewing angle, i.e., at an excessively oblique viewing angle relative to the user. Design measures to achieve a better viewing angle could include one or more of;

a) increasing the span S2 of the open end of hook portion 14 by increasing the included angle θ between the outer side member 14A of the hook portion 14 and its closed end 14C, so that, e.g., the opposed side members 14A/14B of the hook portion are parallel to each other, or the outer side member 14A is angled away from the spine, so that angle θ is obtuse;

b) reducing the height of the outer side member 14A of hook portion 14 (mentioned previously to reduce obscuration of the screen);

c) increasing the breadth B2 of the closed end 14C of hook portion 14;

These design measures would also tend to reduce or eliminate contact of the outer side member 14A of hook portion 14 with the surface of the screen device 22. Any such contact could also be ameliorated by applying large radii to the corners of the outer side members 14A of hook portions 14 which are liable to contact the surface of the screen device.

The above design measures could also, or alternatively, be applied mutatis mutandis to hook portion 12.

Although in FIGS. 1A to 1D, dimensions of the hook portions 12 and 14 are shown as being the same, the reader will understand that they could be different from each other. For example, dimensions B1, B2, S1, and S2 could be varied to cater for varying thicknesses of the screen device 22 and the laterally extending edge surface 16.

Figure 2A:
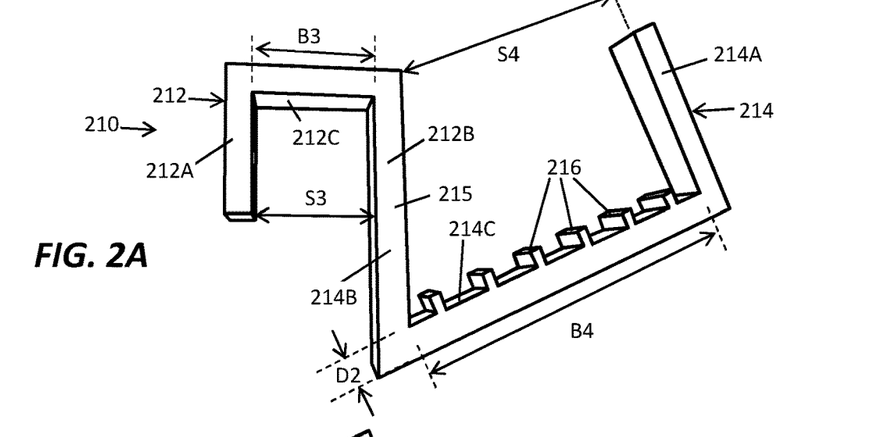
FIGS. 2A, 3A and 4A are perspective views of hooked members that form parts of mountings according to second, third and fourth embodiments, respectively.
Figures 3A, 4A:
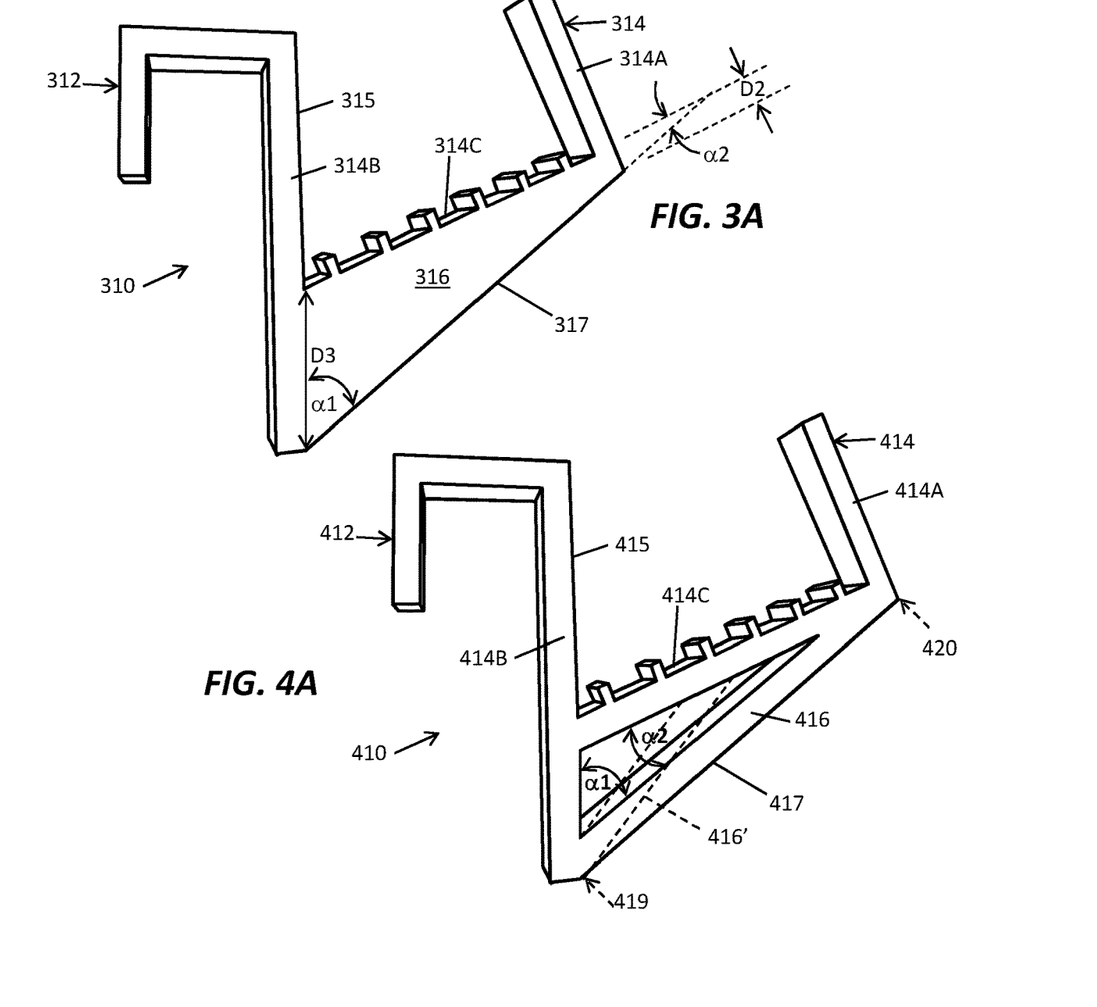

Turning now to FIGS. 2A, 3A and 4A, three embodiments are shown, in all of which the hook portions 212/214, 312/314, and 412/414 of the hooked members 210, 310 and 410, respectively, are arranged on their respective spines 215, 315, 415 in a back-to-back configuration with respect to each other, i.e., the hook portions are at least partly coextensive with each other on opposed sides of the spine.

Another thing that the variants of FIGS. 2A, 3A and 4A have in common is that each hooked member 210, 310, 410 comprises a relatively short spine 215, 315, 415 provided with first and second hook portions 212/214, 312/314, 412/414 that differ from each other in shape and configuration. Taking FIG. 2A as exemplary also of FIGS. 3A and 4A in this respect, hook portion 212 has a square/rectangular configuration with opposed side members 212A, 212B that run parallel to each other, and its open end has a relatively narrow span S3 that in use would embrace, e.g., the upper edge of a seat-back tray in the "up" position (not shown). In contrast, hook portion 214 has an out-of-square configuration in which its closed end 214C meets the spine 215 at an acute angle of, e.g., 60 to 70 degrees, while its outer side member 214A meets the closed end 214C at, e.g., right angles. Additionally, the span S4 of the open end of hook portion 214 is much wider than span S3, e.g., span S4 is here shown as twice the dimension of span S3. Note also that the breadth B4 of closed end 214C is much greater than the breadth B3 of closed end 212C. By way of example, breadth B4 is here shown as three times greater than breadth B3.

The broad span hook portion 214 further differs from the narrow span hook portion 212 in that it is provided with several ridges 216 that have rectangular cross sections, though other cross sections could be used, e.g., triangular or curved. Ridges 216 are spaced apart from each other along the closed end 214C of the broad span hook portion between its opposed side members 214A, 214B. The ridges 216 act as detents that can engage a lower edge of the screen device (not shown) to hold the screen device at several different angles for viewing. In the embodiment of FIGS. 2 to 4, while the mounting is in use with a seat-back tray in the "up" position, the upper edge of the screen device can recline against the forward-facing surface of the tray, or even the seat back or headrest of the seat in front, if the spine 215, 315, 415 does not extend upwards sufficiently to provide support to the screen device.

FIG. 3A illustrates a variant hooked member 310, which differs from the variant shown in FIG. 2A only in the size and shape of the body 316, of which the broad-span hook portion 314 is a part. Thus, in FIG. 2A, ignoring the positions where the detents 216 are located, the depth D2 of the solid body forming the hook portion's closed end 214C is constant over the latter's breadth B4, but in FIG. 3A, the depth of the solid body 316 forming the hook portion's closed end 314C tapers from a maximum D3 where the closed end joins the spine 315, to a minimum D2 where the closed end joins the outer side member 314A of hook portion 314. This gives the body 316 an approximately triangular or quadrilateral shape as seen in side elevation. It will further be seen that the underside 317 of the body 316 makes a first acute included angle α1 (e.g., about 50 degrees) with a straight line produced as a continuation of the spine 315, and a second acute included angle α2 (e.g., about 15 degrees) between a straight line produced as an extension of the underside 317 of the body 316 and a straight line produced as an extension of the closed end 314C of the broad-span hook portion 314.

The shape of the body 316 substantially enhances the rigidity of the closed end 314C of hook portion 314 as it supports the screen device. Moreover, the underside 317 of the body 316 is well adapted to provide a base to enable the hooked member 310—and of course the mounting as a whole—to sit on a substantially horizontal surface, such as a seat-back tray when it is in the "down" position. Use of the mounting on a horizontal surface may be termed a second mode of use of the mounting, the first mode of use being when it is hung from, e.g., the upper edge of a seat-back tray.

FIG. 4A illustrates a further hooked member 410, which differs from the embodiment shown in FIG. 3A in that the solid body 316 forming the hook portion's closed end 314C in FIG. 3A is replaced by a support strut 416 that extends underneath the closed end 414C of broad-span hook portion 414 and connects a downward extension of spine 415 to the underside of the broad-span hook portion 414. This reduces the amount of material required to make the hooked member 410. The strut's underside 417 serves as an underside of the hooked member 410, and is angled relative to the spine 415 and the closed end 414C of the broad-span hook portion 414 so that when the complete mounting is placed on a substantially horizontal surface, the screen device can be held at a convenient angle for viewing. The strut 416 makes a first acute included angle $\alpha 1$ with the spine 415 and a second acute included angle $\alpha 2$ with the closed end 414C of the broad-span hook portion 414.

Although the strut 416 in FIG. 4A is shown as extending underneath the closed end 414C of hook portion 414 for the entire breadth of the closed end 414C, it would be possible to provide a modified hook portion 414 with a shorter strut that would intersect the closed end 414C part of the way across its breadth, as approximately indicated by the dashed lines 416'. In this case the angle $\alpha 1$ would be smaller, and the angle $\alpha 2$ would be greater, than shown in FIG. 4A. Furthermore, when part of a mounting holding a screen device in the second mode of use, the modified hooked member 410 with the shorter strut 416' would contact a horizontal flat surface only at points 419 and 420.

Figure 2B:
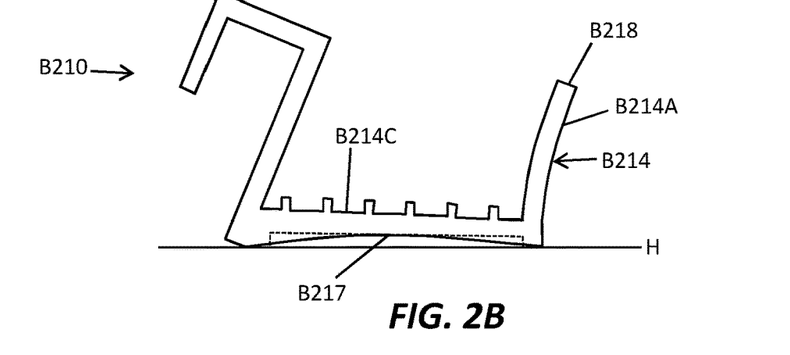
FIGS. 2B, 3B, and 4B are respectively side elevations of variants of the embodiments shown in FIGS. 2A, 3A and 4A, in which selected portions of the hooked members are curved instead of straight.
Figure 3B:
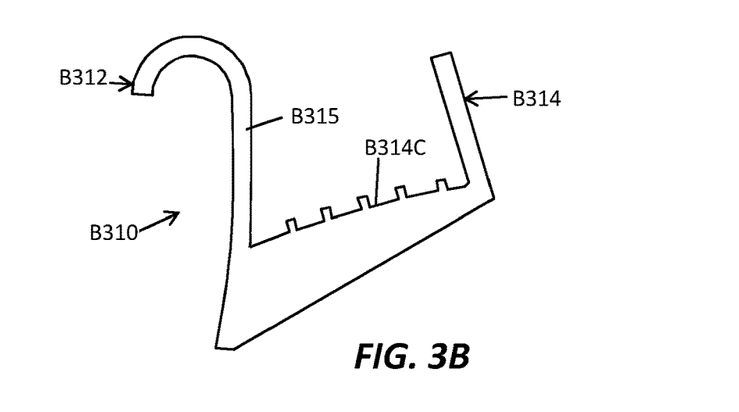
Figure 4B:
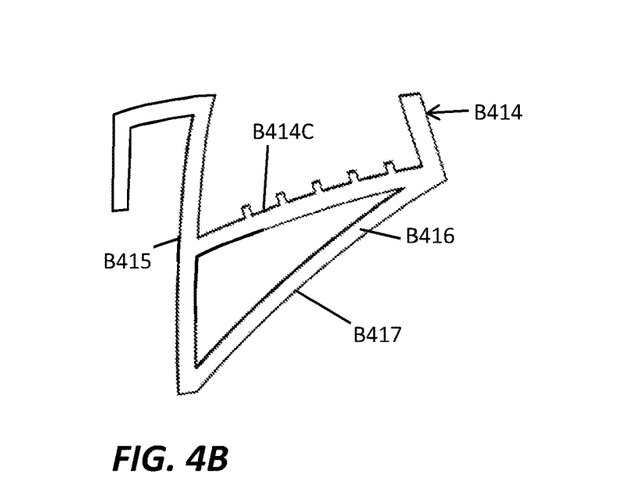

FIGS. 2B, 3B and 4B illustrate variants of the embodiments of FIGS. 2A, 3A and 4A, in which selected portions of the hooked members are curved instead of being straight. Incorporation of such curved portions is at the discretion of the designer. For example, instead of being rectilinear, the hook portions or spines may have curved portions to make them conform more exactly to surfaces with which they come into contact. Alternatively, such curved portions of the hooked members may be configured to avoid contact with surfaces when such contact could be disadvantageous.

For example, in FIG. 2B, the closed end B214C of the second hook portion B214 has an underside B217 that is concave with respect to a horizontal surface H on which it sits when used in the above-mentioned second mode. Thus, the front and rear parts of the underside B217 contact the surface H, but a middle portion of the underside does not contact the surface. This may aid stability of the mounting in situations where the horizontal surface H is not completely flat.

Although in FIG. 2B the underside B217 of the second hook portion B214 is shown as having a gradual concave curve, a shallow recess in the underside B217, as illustrated by the dashed lines, would achieve a similar function.

As will also be noticed in FIG. 2B, the outer side member B214A of the second hook portion B214 is slightly curved, such that the free end B218 of the outer side member B214A is located forward of the point where the outer side member B214A joins the closed end B214C of the second hook portion B214. This curvature would be effective to avoid contact with the screen of a screen device held in the second hook portion B214.

In FIG. 3B, a hooked member B310 has a slightly curved spine B315 and a more emphatically curved first hook portion B312, these curved portions being provided so that hooked member B310 can conform more nearly to curved front and upper edge surfaces of a seat-back tray when a mounting comprising two hooked members B310 is used in the above-mentioned second mode. Additionally, the closed end B314C of the second hook portion B314 has a slight convex curvature.

FIG. 4B is a variant of FIG. 4A in which the curved portions comprise a spine B415 with a slight curvature in the opposite sense to that of spine B315 in FIG. 3. FIG. 4B also exhibits a curved strut B416 whose underside B417 is curved similarly to underside B217 in FIG. 2B, and a closed end B414C of hook portion B414 with a slight convex curvature.

Figures 5A, 5C:
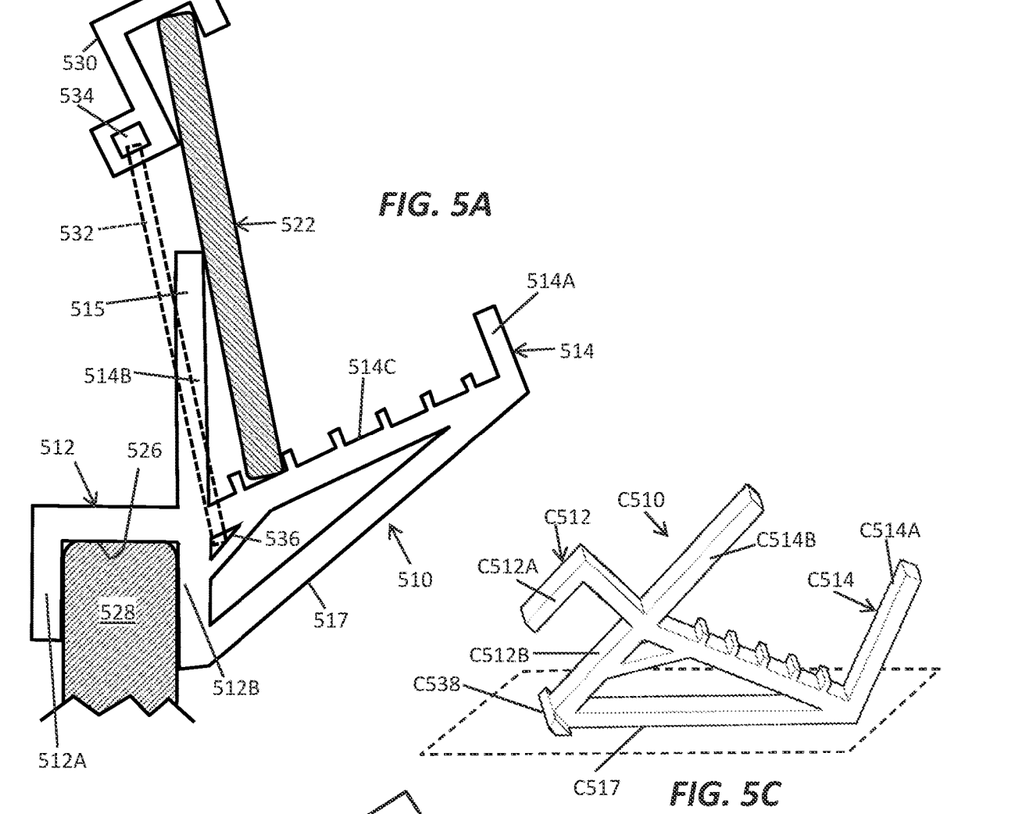
FIG. 5A is a side elevation of a mounting according to a fifth embodiment, in which a hooked member is provided with a clip for embracing the upper edge of a tablet computer and holding it against movement relative to the hooked member by resiliently and elastically coupling the clip to the hooked member.
FIG. 5C is a perspective view of a variant of FIGS. 5A and 5B.
Figure 5B:
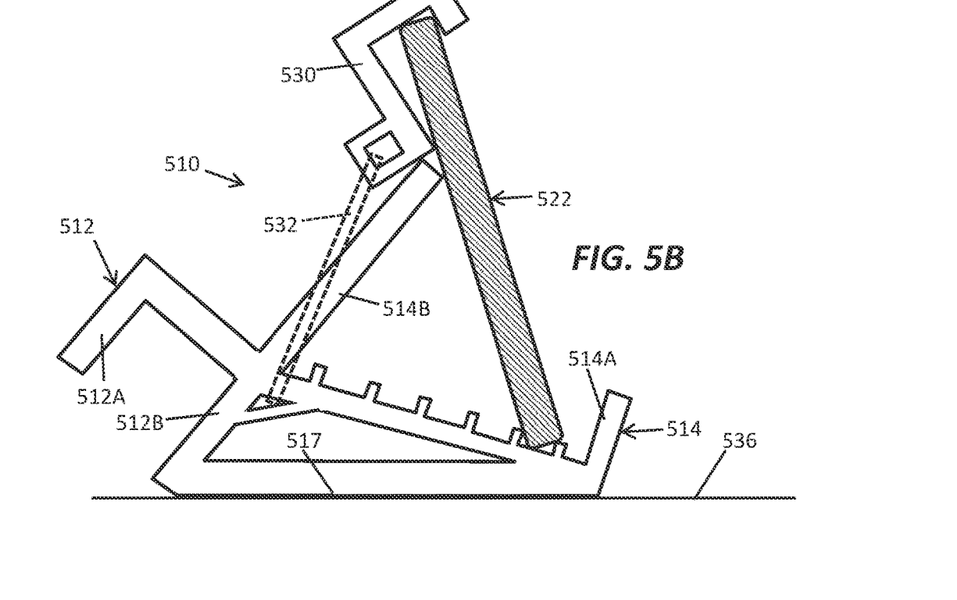
FIG. 5B is another side elevation of the mounting of FIG. 5A, but showing the mounting with its underside resting on a horizontal surface, while holding a screen device for hands-free viewing.

FIGS. 5A and 5B illustrate a further embodiment of a mounting for portable screen devices. FIG. 5A shows a side elevation of a mounting in its first mode of use, comprising two hooked members 510 holding a screen device 522 for hands-free viewing, the mounting being located on the laterally extending upper edge 526 of a seat-back tray 528 in the "up" position. FIG. 5B shows the same mounting 510, but in its second mode of use, with its underside 517 resting on the horizontal surface 536 of a seat-back tray in the "down" position, while holding a screen device 522 at a suitable viewing attitude for that position of the tray.

As viewed in its first mode of use, the hooked member 510 differs from the embodiments of FIGS. 2A to 4A in that hooked member 510 has a first, narrow span, hook portion 512 (comprising opposed straight side members 512A, 512B of that hook portion 512) that instead of being provided at the upper end of spine 515, is provided at a lower position on spine 515 than the similarly shaped narrow span hook portions in FIGS. 2A to 4A. Note that hooked members 510 could be readily produced with their narrow-span hook portions 512 at the top or the bottom of the spine 515, or at any intermediate position, but in this case hook portion 512 (on the opposite side of the spine 515 from the second, broad span, hook portion 514) has an open end that is located adjacent the lower end of the spine 515, below the closed end 514C of the second, broad span, hook portion 514 (which latter hook portion 514 comprises opposed straight side members 514A, 514B). Thus, in its first mode of use, hook portion 512 extends below the second hook portion 514 when the hooked member 510 is located on the upper edge 526 of seat-back tray 528 when the latter is in the "up" position. This enables the mounting to hold screen device 522 at a higher position, relative to upper edge 526 of seat-back tray 528, than would be possible with a mounting comprising the embodiments of FIGS. 2A to 4A. Providing hook portion 512 low down on the spine 515 is intended to improve the viewing angles for screen devices held in mountings comprising hooked members 510, particularly when the laterally extending edges on which the mountings are positioned are low down compared to the eye level of the average person.

For convenience, a complete mounting for a portable screen device may be provided as a kit of parts including two substantially identical hooked members, such as shown in the accompanying Figures, which are laterally spaced apart from each other to support the screen device in a stable position.

It should be understood that in the embodiment of FIGS. 5A and 5B, each of the hooked members 510 that together comprise a mounting may—at the discretion of the designer—be provided with curved portions similar to those shown in FIGS. 2B to 4B.

Referring again to FIGS. 5A and 5B, the kit of parts for the complete mounting preferably includes further components comprising a clip or hook 530 and a resilient member 532, such as an elasticated cord, or even a simple elastic band, as indicated by dashed lines. The clip 530 is configured to embrace an upper edge of screen device 522 and by means of the resilient member 532 the clip can be resiliently coupled to the hook member 510, thereby restraining the screen device against movement relative to the hook member and the complete mounting. To facilitate resilient coupling of the clip 530 to the hooked member 510, both members are provided with respective attachment points 534 and 536 comprising apertures in the clip 530 and the hooked member 510 respectively. The resilient member 532 is connected between the attachment points under tension and its ends are retained in the apertures 534, 536 by retaining means. If elasticated cord is used as the resilient member, such retaining means could simply comprise looping the cord through the apertures, knots in the ends of the cord, or so-called drawstring toggles or cord locks (not shown). If desired, the kit could include two clips 530 and two resilient members 532, enabling the screen device to be resiliently restrained to both of the hooked members in the mounting.

The concept of resiliently coupling a clip member to one or both of the hooked members in order to restrain relative movement between the screen device and the mounting is also applicable to the other embodiments disclosed herein.

Turning now to FIG. 5C, there is illustrated a perspective view of a variant of the type of hooked member shown in FIGS. 5A and 5B. In FIG. 5C a hooked member C510 is shown in its second mode of use, in which it is sitting on a horizontal surface, indicated by dashed lines. The first hook portion C512 of each hooked member C510 comprises opposed straight side members C512A, C512B and the second hook portion C514 thereof comprises opposed straight side members C514A, C514B. In this variant, stability of the mountings in the second mode of use is enhanced by providing the underside C517 of the second hook portion C514 on each hooked member C510 with at least one feature effective to broaden the underside C517 where it contacts the horizontal surface, such feature in FIG. 5C being the foot C538, or similar.

Figure 6A:
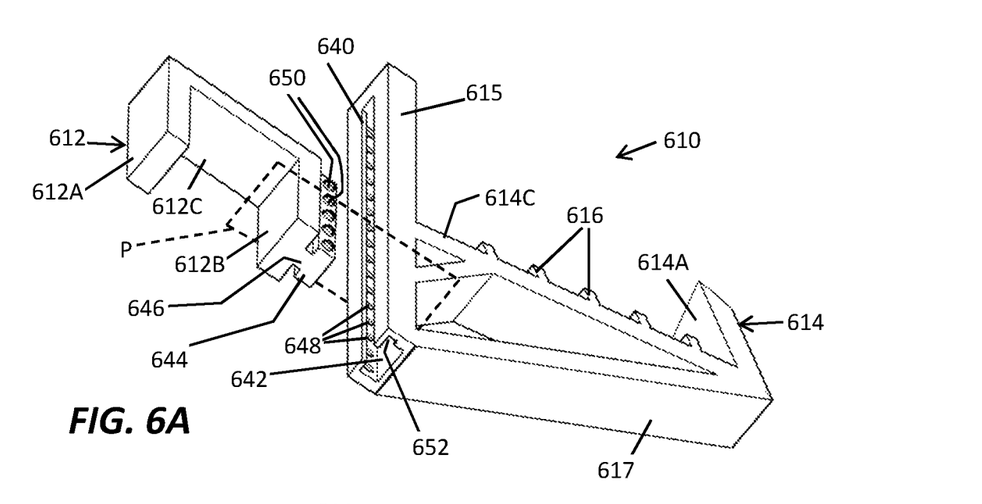
FIG. 6A is an exploded perspective view of an embodiment in which a hooked member is provided with a hook portion whose position on the hooked member is adjustable.
Figure 6B:
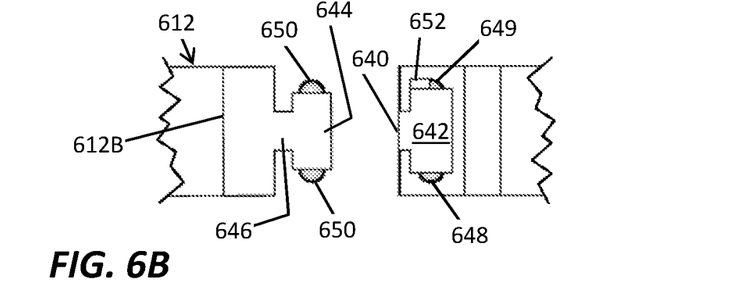
FIG. 6B is a sectional view on plane P of FIG. 6A, looking in the upward direction of FIG. 6A.
Figure 6C:
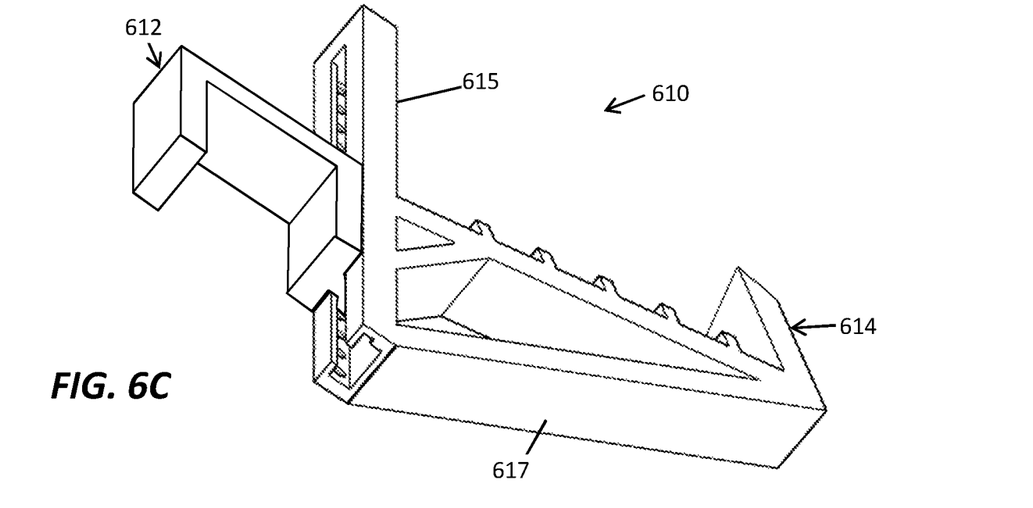
FIG. 6C is a view similar to FIG. 6A, but showing the hook portion assembled to the hooked member.

Whereas in the previously described embodiments, both the first and the second hook portions are unitary and integral with the spine of each hooked member, in a further embodiment, illustrated in FIGS. 6A to 6C, a hooked member 610 is provided with a first, narrow span hook portion 612 that is formed separately from the spine and that is attachable to, and detachable from, the spine. The position on the spine 615 of the hooked member is adjustable because the first hook portion is slideable on the spine and lockable in selected positions on the spine. To achieve this, as best shown in the exploded views of FIGS. 6A and 6B, the spine 615 is provided with a slot 640 extending longitudinally of the spine. The slot communicates with a longitudinally extending channel 642 formed internally of the spine 615. Unlike the previous embodiments, the inner side member 612B of the first hook portion 612 is provided with a flange 644, that has a shape complimentary to the shape of the channel 642, and a stem portion 646 that in use extends through the slot 640 to join the flange portion 644 to the inner side member 612B of the first hook portion. The interior of the channel is provided with two rows of longitudinally spaced apart indentations 648, 649, a row on each opposed side of the channel, whereas opposed sides the flange portion 644 are provided with protrusions 650 that are of a complimentary shape to the indentations 648, 649. When the flange portion 644 is correctly aligned relative to the channel 642, the protrusions 650 engage with the indentations 648, 649 and lock the first hook portion 612 into position at a selected position on the spine 615.

To facilitate initial attachment of the first hook portion 612 to the spine 615, and to enable sliding of the first hook portion up and down the spine, the slot 640 and the channel 642 are open-ended at one or both ends of the spine and one side of the channel has a re-entrant profile 652 that extends along the whole length of the channel and merges with the row of indentations 649 on the same side of the channel, as shown in FIG. 6B This allows insertion of the flange 644 and stem 646 into the channel 642 and slot 640, respectively, at a skew angle. The first hook portion 612 can then be slid to a desired position on the spine 615 before it is twisted into a locked position, as shown in FIG. 6C, in which the protrusions 650 on both sides of the flange 644 are engaged with the indentations 648, 649.

The mountings of the present disclosure can be easily and cheaply mass-produced as plastic mouldings or by 3-D printing techniques and the components that together make up individual mountings will preferably be supplied in kit form. It should be understood that in all embodiments of the hooked members, the shapes and lengths of their spines, the shapes, dimensions and angles of the hook portions, and the positions of the hook portions on the spines, are all at the discretion of the designer and will be chosen based on an understanding of the dimensions of the screen devices to be supported and the objects supporting the mountings. Note that in all embodiments, the internal corners at the junctions between the opposed side members and the closed ends of the hook portions should preferably be radiused to minimise stress concentrations.

Although the present disclosure has focused on the use of the above-described mountings in conjunction with seat-back trays in passenger vehicles, the claims are not limited to such, since it is evident that if desired, the mountings can used in conjunction with many other types of objects, e.g., tables, desks, chairs, etc.

The invention claimed is:

1. A mounting configured to hang from a laterally extending edge of an object that has an upwardly extending surface and to support a portable screen device in a position for hands-free viewing; the mounting comprising a pair of hooked members, wherein the hooked members are, when in use supporting the device, laterally spaced apart from each other, each hooked member having a spine provided with first and second hook portions, each hook portion comprising an open end and a closed end bounded by inner and outer, mutually opposed, side members of that hook portion, and the first and second hook portions being arranged on opposite sides of the spine to face in mutually opposed directions, such that in use the second hook portion engages the screen device, the mounting being further provided with means for additionally engaging the screen device during use to restrain or hold the screen device against relative movement between the screen device and the mounting;

wherein the means for additionally engaging the screen device comprise a pair of clip members, each clip member being configured to, in use, embrace an upper edge of the screen device, and a pair of resilient coupling members, each said coupling member coupling a respective said clip member to a respective said hooked member, and wherein each respective said clip member and corresponding respective said hooked member to which the corresponding respective said clip member is coupled are each provided with a respective attachment point for attaching thereto the corresponding respective said resilient coupling member.

2. A mounting according to claim 1, wherein, in use, the first hook portions of each hooked member are open in the downward direction and extend rearwardly to engage with said laterally extending edge and the second hook portions are open in the upward direction and extend forwardly from said upwardly extending surface to engage a lower edge of said screen device.

3. A mounting according to claim 1, in which the hook portions of each hooked member are rectilinear in configuration, such that the closed ends of the hook portions are straight between opposed straight side members of the hook portions.

4. A mounting according to claim 1, in which, for the first hook portions and/or the second hook portions of each hooked member, as seen in side elevation:
the outer side members of the hook portion(s) are angled towards the spine, or
opposed inner and outer side members of the hook portion(s) extend parallel to each other, or
the outer side members of the hook portion(s) are angled away from the spine.

5. A mounting according to claim 1, in which at least part of at least one of the hook portions of each hooked member is curved or otherwise deviates from a straight line.

6. A mounting according to claim 1, useable in first and second modes of use, the first mode of use being when hanging from said laterally extending edge of said object with said upwardly extending surface, and the second mode of use being when sitting on a substantially horizontal surface, the first and second hook portions of each hooked member respectively comprising:
a relatively narrow span hook portion that in the first mode of use embraces said laterally extending edge of said upwardly extending object; and
a relatively broad span hook portion that supports a lower edge of said screen device in both the first and second modes of use, the broad span hook portion having an underside configured to sit on the substantially horizontal surface in the second mode of use.

7. A mounting according to claim 6, wherein there are provided additional means for additionally engaging the screen device during use to restrain or hold the screen device against relative movement between the screen device and the mounting, and the additional means comprises, in each hooked member, a plurality of detents that are spaced apart along the closed ends of the broad span hook portions between opposed side members thereof, the detents being arranged to engage an edge of the screen device during use, thereby to hold the screen device at a corresponding plurality of different angles for viewing.

8. A mounting according to claim 6, in which one of the following (i) or (ii) is satisfied:
(i) the broad-span hook portion of each hooked member is part of an essentially triangular or quadrilateral body as seen in side elevation, an underside of said body forming an underside of the hooked member, the underside making a first acute included angle with a straight line produced as a continuation of the spine and a second acute included angle between a straight line produced as an extension of said underside and a straight line produced as an extension of the closed end of the broad-span hook portion, whereby in the second mode of use the mounting holds the screen device at a convenient angle for viewing; or
(ii) each hooked member is provided with a support strut that extends underneath the broad-span hook portion and connects the spine to the underside of the broad-span hook portion, an underside of the strut forming an underside of the hooked member, the strut making a first acute included angle with the spine and a second acute included angle with the underside of the broad-span hook portion, whereby in the second mode of use the mounting holds the screen device at a convenient angle for viewing.

9. A mounting according to claim 6, in which one of the following (i) or (ii) is satisfied:
(i) the hook portions of each hooked member are at least partly coextensive with each other on opposite sides of the spine; or
(ii) in the first mode of use, the first hook portion of each hooked member is located below the upper end of the spine.

10. A mounting according to claim 6, in which, in the first mode of use, the open end of the first hook portion of each hooked member is located adjacent the lower end of the spine, below the closed end of the second hook portion.

11. A mounting according to claim 6, in which one of the following (i) or (ii) is satisfied:
(i) the underside of each hooked member is provided with at least one feature effective to broaden said underside where the underside contacts said substantially horizontal surface; or
(ii) the underside of each hooked member is concave or recessed, whereby in the second mode of use, front and rear parts of said underside contact said horizontal surface, but a middle portion of said underside does not contact said horizontal surface.

12. A mounting according to claim 1, in which the following is satisfied: for each hooked member, both hook portions are unitary with the spine.

13. A kit of parts for forming a mounting configurable to hang from a laterally extending edge of an object that has an upwardly extending surface and to support a portable screen device in a position for hands-free viewing, the kit including:
a pair of substantially identically configured hooked members;
a pair of clip members; and
a pair of resilient coupling members;
wherein each said hooked member has a spine provided with first and second hook portions, each hook portion comprising an open end and a closed end bounded by inner and outer, mutually opposed, side members of that hook portion, and the first and second hook portions being arranged on opposite sides of the spine to face in mutually opposed directions, such that the second hook portion is, in use, engageable with the screen device to be supported by the mounting, wherein each said hooked member comprises, for use in forming means for additionally engaging the screen device during use to restrain or hold the screen device against relative movement between the screen device and the mounting, a respective attachment point for use in coupling to the respective said hooked member a respective one of the said resilient coupling members for coupling thereto a respective one of the said clip members;
and wherein each said clip member is configurable to, in use, embrace said upper edge of said screen device and enable resilient coupling of that respective said clip member to a corresponding respective said hooked member, thereby in use to restrain or hold said screen device against relative movement between the screen device and the mounting;

and wherein each said resilient coupling member is for coupling a corresponding respective said clip member to a corresponding respective said hooked member via the corresponding respective said attachment point thereon.

\* \* \* \* \*